United States Patent

[11] 3,628,617

[72] Inventor Richard V. Ferrigan
 Albany, N.Y.
[21] Appl. No. 25,396
[22] Filed Apr. 3, 1970
[45] Patented Dec. 21, 1971
[73] Assignee G A F Corporation
 New York, N.Y.

[54] LIQUID RECIRCULATING AND WEIGHING SYSTEM
 3 Claims, 3 Drawing Figs.

[52] U.S. Cl............................................... 177/116,
 177/71, 177/82, 222/77, 222/318, 177/DIG. 6
[51] Int. Cl..................................................... G01g 13/16,
 G01g 13/26, G01g 13/32
[50] Field of Search........................................ 177/116–118,
 60, 141, 64, 66, 71, 72, 82, 67, 114,
 63, DIG. 6; 222/77, 318

[56] References Cited
 UNITED STATES PATENTS
| | | | |
|---|---|---|---|
| 2,264,562 | 12/1944 | Bryant et al. ................. | 177/116 X |
| 2,273,180 | 2/1942 | De Castro..................... | 177/82 UX |
| 2,597,831 | 5/1952 | Willis ............................ | 177/60 UX |
| 2,787,402 | 4/1957 | Stiner et al.................... | 222/77 X |
| 3,263,971 | 8/1966 | Farnham ....................... | 222/70 X |
| 3,306,495 | 2/1967 | Wabers ......................... | 222/77 |

FOREIGN PATENTS
| | | | |
|---|---|---|---|
| 369,369 | 3/1932 | Great Britain................ | 177/60 |

*Primary Examiner*—Robert S. Ward, Jr.
*Attorneys*—Samson B. Leavitt and Martin Smolowitz ABSTRACT: Liquid dye is pumped by a pump submerged therein from a supply tank through a feed pipeline and into a portable bucket set on one side of a beam balance scale, until a preselected weight of such liquid in the bucket balances the scale, whereupon the other side initiates an electrical signal and operates a relay which energizes a control circuit, activating a solenoid which, in turn, operates valve means in such feed pipeline to switch the entire flow of liquid from the bucket, back to the tank through a liquid return pipe, thereby recirculating such liquid as long as the pump is running, which agitates the liquid dye in the tank, keeps the pump cool, and avoids any need for priming the pump prior to each weighing operation.

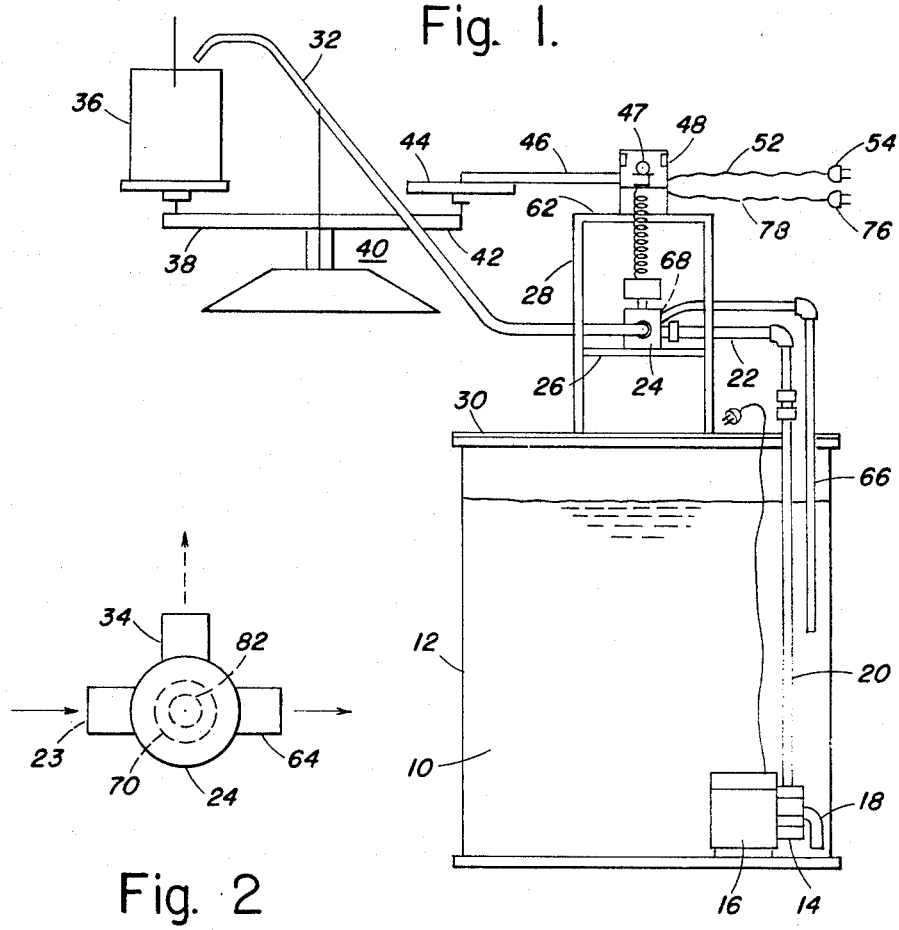
Fig. 1.
Fig. 2
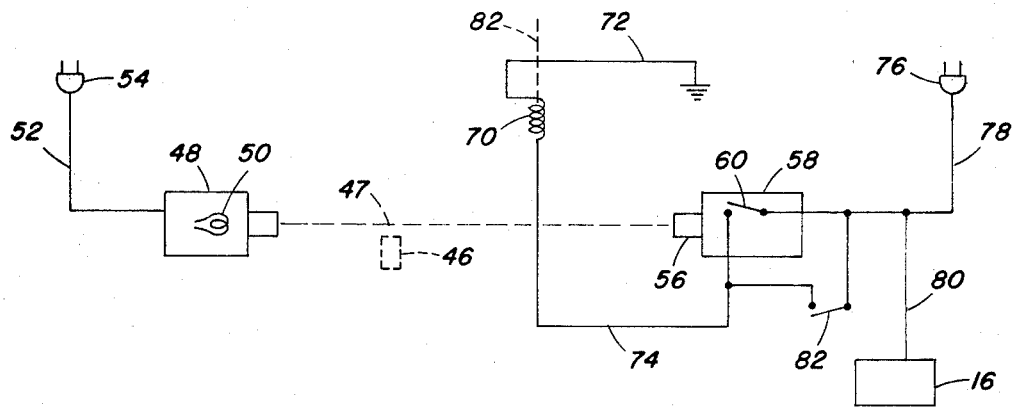
Fig. 3.
INVENTOR.
Richard V. Ferrigan
BY Martin Smolowitz

LIQUID RECIRCULATING AND WEIGHING SYSTEM

This invention relates to liquid-weighing systems, and more particularly to liquid-dye-weight-metering devices.

Commercial metering devices are available that are based on volume as distinguished from weight of liquids. However, since dyes are sold on a weight basis rather than on a volume basis, there exists a real and pressing need for metering dyes in solution or dispersion form, by weight.

The main object of this invention is to provide a liquid-dye-weighing system which not only fills such need, but which also keeps the liquid dye agitated and well mixed prior to each weighing operation.

Another object is to provide a liquid-weighing system including means for automatically recirculating the liquid in the system between weighing operations which not only smooths valving of the liquid, but also helps keep the liquid-pumping motor cool, and avoids any need for priming the pump prior to each weighing operation or cycle.

Thus, according to the invention there is provided a liquid dye tank or reservoir having a cover on which a frame is mounted. A valve unit is, in turn, mounted in the frame which also carries an electric relay for operating a valve controlling solenoid. The valve unit has an inlet way for receiving liquid dye from a supply pipe into which the liquid is forced by an electric pump submerged therein adjacent the bottom of the tank. The valve unit also has two outlet ways: one connected to a recirculation line leading back into the tank, and the other connected a flexible line leading to point above the open top of a portable receptacle or bucket for containing a preselected weight of the liquid dye that is delivered thereto during each weigh cycle. The bucket is set on one side (arm) of a beam balance scale, the other side (arm) of which carries a standard weight carrying pan having a light-beam-breaking shaft extending therefrom. A light source and a photoelectric cell are mounted on the top of the frame so that the beam of light from such source is projected toward the cell at right angles to the vertical path of movement of the shaft about the axis of the beam balance of the scale.

When the pump is operating, the liquid dye continuously recirculates by way of the valve unit; or is pumped by way of such unit into the bucket until it contains the preselected weight thereof, whereupon the beam tilts just enough for the shaft to break the light ray, operating the solenoid which shifts the entire flow of liquid dye back to recirculation thereof.

The valve unit preferably is a three-way solenoid-type valve. Its novel function in the present invention is threefold: (1) by returning the liquid dye to the reservoir, beneficial agitation of the solution, or dispersion, in the reservoir is affected; (2) by returning the liquid between weighing cycles, undesirable heat which is generated by the pump motor is dissipated; and (3) as long as the pump is running, the suction head is held, which precludes any need of priming of the pump prior to each weighing cycle. Another very important feature of the invention resides in the fact that undesirable jarring of the hydraulic flow which would be caused by sudden stoppage of the liquid flow by a shutoff valve is avoided, since simple shifting of the flow from weighing to recirculating permits the pump to continue smoothly without interruption.

In the drawing,

FIG. 1 is a view mainly in side elevation of a system illustrative of the invention.

FIG. 2 is a flow diagram of the three-way valve.

FIG. 3 is a simplified circuit diagram of the system.

The liquid dye 10 is initially contained in a supply drum or tank 12 which proves a convenient reservoir therefor. A submersible pump 14 which is driven by an electric motor 16 is located in the bottom of the tank 12, and is provided with a liquid dye intake pipe 18 and a vertical outlet pipe 20 which leads to a horizontal pipe that is connected the "in" way 23 of a three-way valve unit 24. The valve unit 24 is mounted on a shelf 26 of a frame 28 which is, in turn, mounted on a cover 30 on the top of the tank 12, A flexible pipeline 32 is connected to the normally closed outlet way 34 of valve unit 24 and is angled upwardly and then downwardly to feed liquid dye into the open top of a portable receptacle bucket 36 which is set on the weighing side 38 of a beam balance scale 40. The other side 42 of the scale 40 is provided with a standard weight receiving pan 44 to which is attached a shaft 46 comprising a light beam breaker when the liquid dye fed into the bucket 36 tilts the scale to balance the desired weight. Such light beam 47 is produced by a light source 48, or exciter, containing an electric lamp 50 which is connected to a suitable source of electricity by a cable 52 and plug 54. The light beam 47 is directed horizontally toward a photoelectric cell 56 in a relay 58 containing a normally open switch 60 that closes when the light beam 47 is interrupted or broken by the beam breaker shaft 46.

The beam light source 48 and photoelectric cell 56 are mounted on the top 62 of frame 28, so that the light beam 47 is directed at right angles to the axis of tilt of the scale 40. The valve unit 24 is provided with a normally open outlet way 64 that is connected to a recirculating pipeline 66 which leads back to the interior of the tank 12. A valve 68 in the unit 24 is operated by a solenoid 70 to close normally open way 64 and open the normally closed way 34 when the solenoid 70 is energized by closure of the switch 60 in relay 58. The solenoid is energized through a ground lead 72 and an insulated lead 74 from a suitable electric power source to which plug 76 and cable 78 are connected. The pump motor 16 is energized when the plug is connected to the electric source, through a branch cable 80. A manually operable normally open switch 82 is connected in parallel circuit relation with the photocell relay switch 60.

The valve unit 24 is provided with an iron piston 82 on the inside thereof, so that when current flows through the coil or solenoid 70 thereof, magnetic pull lifts the piston 82, diverting the liquid dye flow from the normally open outlet way 64 to the normally closed outlet way 34. Then, when such current is "off," the iron piston 82 drops, restoring flow to the normally open outlet way 64.

A recommended three-way solenoid valve quite suitable for the invention is described in detail by ASCO Bulletin No. 8320, Form No. V5291–R1, Printed in USA, 1967, by Automatic Switch Co., Florham Park, N.J. Such Bulletin refers to U.S. Pat. Nos. 3,262,027; 3,281,740; and 3,303,854; as well as British Pat. No. 1,059,368. However, the invention is not limited to this particular three-way valve.

OPERATION

The beam balance scale 40 is first loaded with suitable weights to balance a desired correct weight of the liquid dye to be fed to the bucket 36. The liquid dye 10 is then fed to the bucket 36 from tank 12 by pump 14 through pipeline 20 and 22, then through the valve unit 24, and flexible pipeline 32. When the desired weight of liquid dye is fed into the bucket 36, the beam balance scale 40 tends to overbalance the weights, the shaft 46 tilts into the path of light beam 47, breaking the same and thereby operating the photoelectric cell. This causes the three-way solenoid valve unit 24 to be activated, which shifts the flow of liquid dye back to the reservoir 12, at the same time flow of liquid dye 10 to the bucket 36 stops. The bucket 10 is replaced by one that is emptied and the weighing cycle is repeated.

To compensate for somewhat more liquid dye being delivered to the bucket in excess of that the desired weight, due to the time lag between the operation of the relay 58 and that of the solenoid valve piston 82, which excess is relatively constant for each weighing cycle, such excess is weighed after the first cycle, and an amount equal thereto, in effect, subtracted by adding a balance weight equal to the excess for subsequent cycles. For example, a 25-gram liquid excess in the first run can be compensated by the addition of a 25-gram weight to the breaker pan in subsequent runs.

An important advantage of the invention is that the position of the valve is such that the liquid dye continuously recirculates, agitating the liquid dye in the reservoir. This is highly beneficial not only for dyestuff solutions, and dispersions, but also for detergent solutions, solutions of pharmaceuticals and biological agents, oils and the like. The term "liquid dye" used herein is intended to include all of such materials.

Another advantage is that the system operates smoothly without any jarring "hammer" when the flow is shifted back to the reservoir after each weighing run. A further advantage is that the liquid is kept cool by the continuous recirculation of the liquid between runs. Also the system is very accurate in measuring or metering liquid by weight as distinguished from volume.

What is claimed is:

1. A liquid recirculating and weighing system comprising, in combination:

a liquid reservoir;

means for pumping liquid from said reservoir into a portable receptacle;

means including a three-way valve unit for controlling the flow of the liquid from said pumping means, to such receptacle and back to the reservoir;

means for weighing the liquid pumped into said receptacle, means operated by said weighing means for operating said three-way valve unit when the receptacle receives a certain weight of such liquid to shift the flow of liquid from the receptacle back to the reservoir; and means for then conducting liquid pumped by said pumping means back into the reservoir without any interruption of the pumping operation.

2. The invention as defined by claim 1, in which the reservoir comprises a liquid supply tank, the pumping means comprises an electric motor driven pump submerged in the liquid adjacent the bottom of said tank, the three-way valve unit operating means comprises a solenoid circuit, a source of light, and means directing a beam horizontally therefrom, a a photoelectric relay having a light-sensitive cell toward which such light beam is directed, and a beam balance scale adapted to support the receptacle on one side and having a selected standard weight-receiving pan provided with means adapted to break such light beam when the scale is balanced, whereby to operate said three-way valve by energizing said solenoid circuit.

3. The invention as defined by claim 2, in which a cover is provided for the top of said tank, a frame is mounted on said cover having a shelf on which said three-way valve is mounted; and a means supporting said photoelectric cell and relay, as well as said source of light on the top of said frame, with sufficient horizontal space therebetween for free vertical movement of said shaft about the axis of the beam balance scale, a flexible pipeline extending from the normally closed outlet way of said valve unit to a joint above a receptacle on the scale, a pipeline connecting the output of said pump to the input way of said valve unit, and a recirculating line connecting the normally open outlet way of said valve unit to the interior of the tank, whereby the discharge agitates the liquid between weighing cycles of the system.

* * * * *